(12) United States Patent
Lynch

(10) Patent No.: US 10,334,786 B2
(45) Date of Patent: Jul. 2, 2019

(54) BALE ACCUMULATOR AND BALE ACCUMULATION METHODS

(71) Applicant: Francis Lynch, Jermyn, PA (US)

(72) Inventor: Francis Lynch, Jermyn, PA (US)

( * ) Notice: Subject to any disclaimer, the term of this patent is extended or adjusted under 35 U.S.C. 154(b) by 0 days.

(21) Appl. No.: 16/104,070

(22) Filed: Aug. 16, 2018

(65) Prior Publication Data

US 2018/0352745 A1 Dec. 13, 2018

Related U.S. Application Data

(63) Continuation of application No. 15/263,694, filed on Sep. 13, 2016, now abandoned.

(51) Int. Cl.
*A01D 90/12* (2006.01)
*A01D 85/00* (2006.01)
*A01D 90/10* (2006.01)

(52) U.S. Cl.
CPC ........... *A01D 90/12* (2013.01); *A01D 85/005* (2013.01); *A01D 90/10* (2013.01); *A01D 2085/007* (2013.01); *A01D 2085/008* (2013.01)

(58) Field of Classification Search
CPC ...... A01D 90/12; A01D 90/10; A01D 85/005; A01D 2085/007; A01D 2085/008
USPC ................. 414/24.5, 24.6, 25, 111, 132, 332
See application file for complete search history.

(56) References Cited

U.S. PATENT DOCUMENTS

| | | | |
|---|---|---|---|
| 2,316,435 A | 4/1943 | James | |
| 2,736,159 A | 2/1956 | Marshall | |
| 2,740,250 A * | 4/1956 | Olson | A01D 85/005 193/41 |
| 3,487,955 A * | 1/1970 | Brown | A01D 85/005 414/111 |
| 3,499,550 A * | 3/1970 | Jensen | A01D 85/005 414/111 |
| 3,853,229 A * | 12/1974 | Dougherty | A01D 85/005 414/111 |
| 3,924,757 A * | 12/1975 | Meyer | A01D 85/005 198/418 |
| 3,949,886 A | 4/1976 | Harber et al. | |
| 4,051,964 A | 10/1977 | Meijer | |
| 4,053,064 A | 10/1977 | Stewart | |
| 4,534,691 A | 8/1985 | Miguel | |
| 4,844,675 A | 7/1989 | Strosser et al. | |
| 5,051,964 A * | 9/1991 | Sasaki | H04R 1/406 367/135 |
| 5,478,194 A | 12/1995 | Tilley et al. | |
| 5,639,199 A | 6/1997 | Connell, Jr. | |
| 5,829,238 A * | 11/1998 | Branson | A01D 85/005 56/475 |

(Continued)

*Primary Examiner* — Lynn E Schwenning
(74) *Attorney, Agent, or Firm* — Michael W. Goltry; Robert A. Parsons; Parsons & Goltry, PLLC

(57) ABSTRACT

A bale accumulator for grouping bales for group baling includes a platform, a depositor mounted adjacent to the platform for sequentially depositing bale sets onto the platform, each bale set when deposited onto the platform comprises a pair of bales positioned upright and side-by-side in a packing orientation so that their corresponding long sides are axially juxtaposed, and a packer apparatus mounted adjacent to the platform for packing one bale set at a time from the platform into a group baler trailing the platform each time a bale set is deposited onto the platform from the depositor without changing the packing orientation of the bales of each bale set.

10 Claims, 7 Drawing Sheets

(56) References Cited

U.S. PATENT DOCUMENTS

| | | |
|---|---|---|
| 6,364,591 B1 | 4/2002 | Stevenson |
| 7,275,904 B2 | 10/2007 | Kuhns |
| 7,419,345 B2 | 9/2008 | Priepke |
| 7,682,121 B2 * | 3/2010 | Parrish, Jr. ............ A01D 85/005 198/410 |
| 2004/0223833 A1 * | 11/2004 | Kuhns .................. A01D 85/005 414/111 |
| 2008/0063507 A1 * | 3/2008 | Miller .................... A01D 90/00 414/789.7 |

* cited by examiner

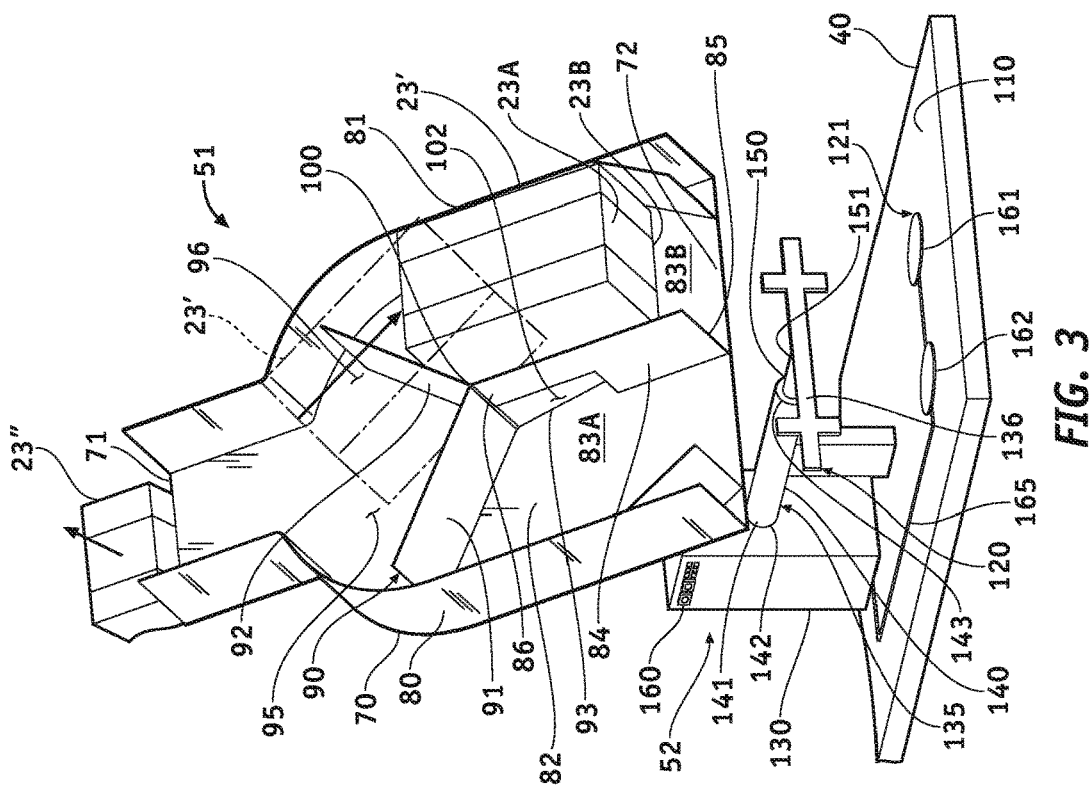
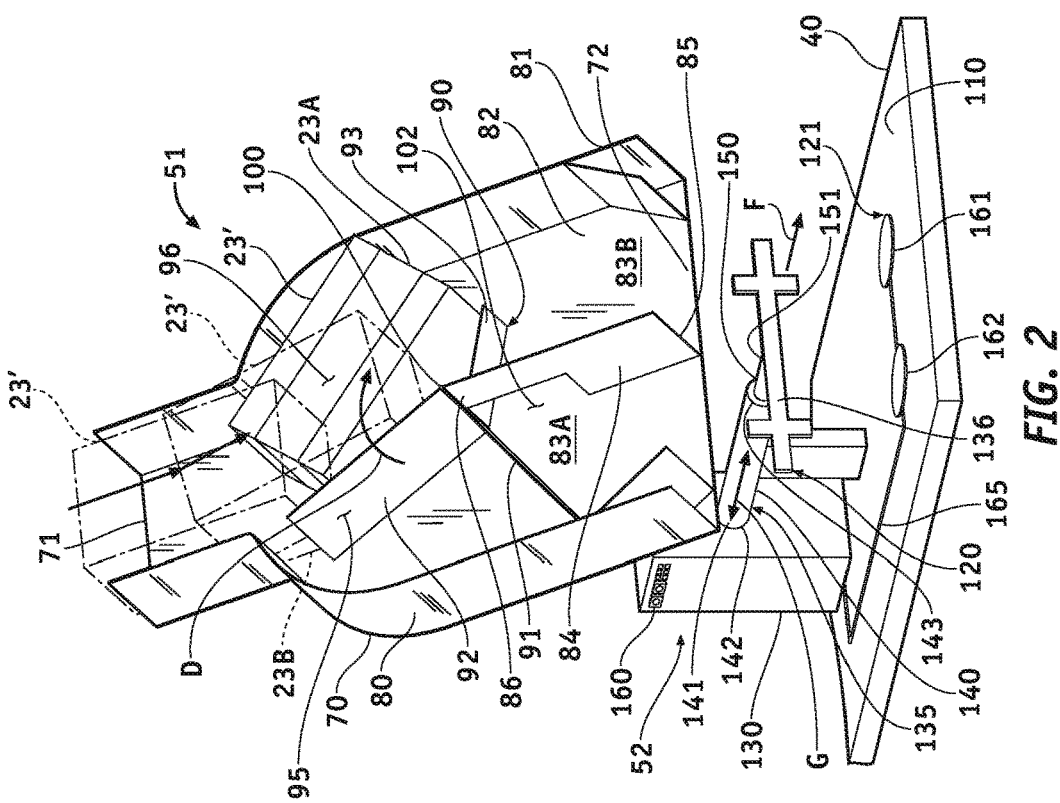

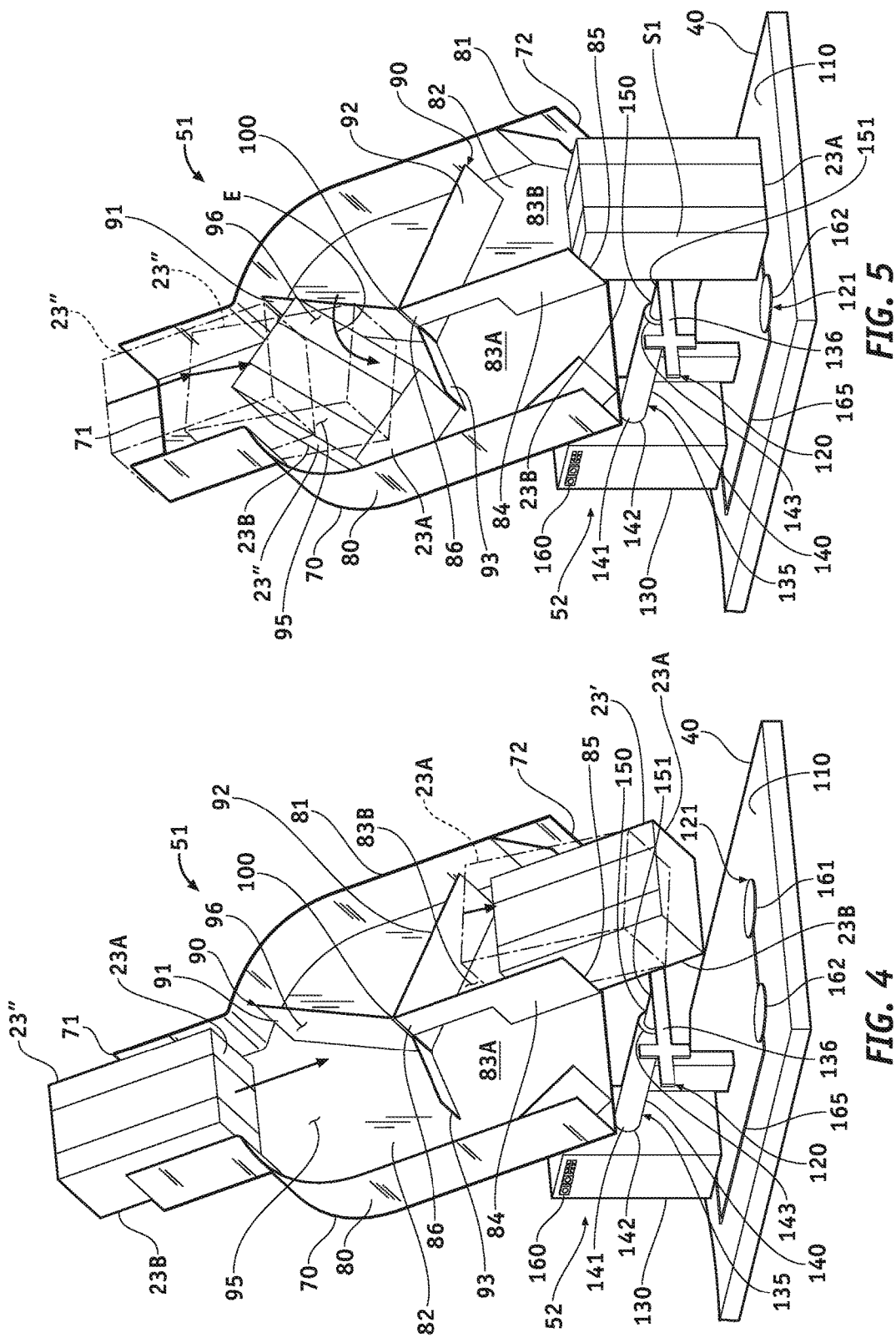

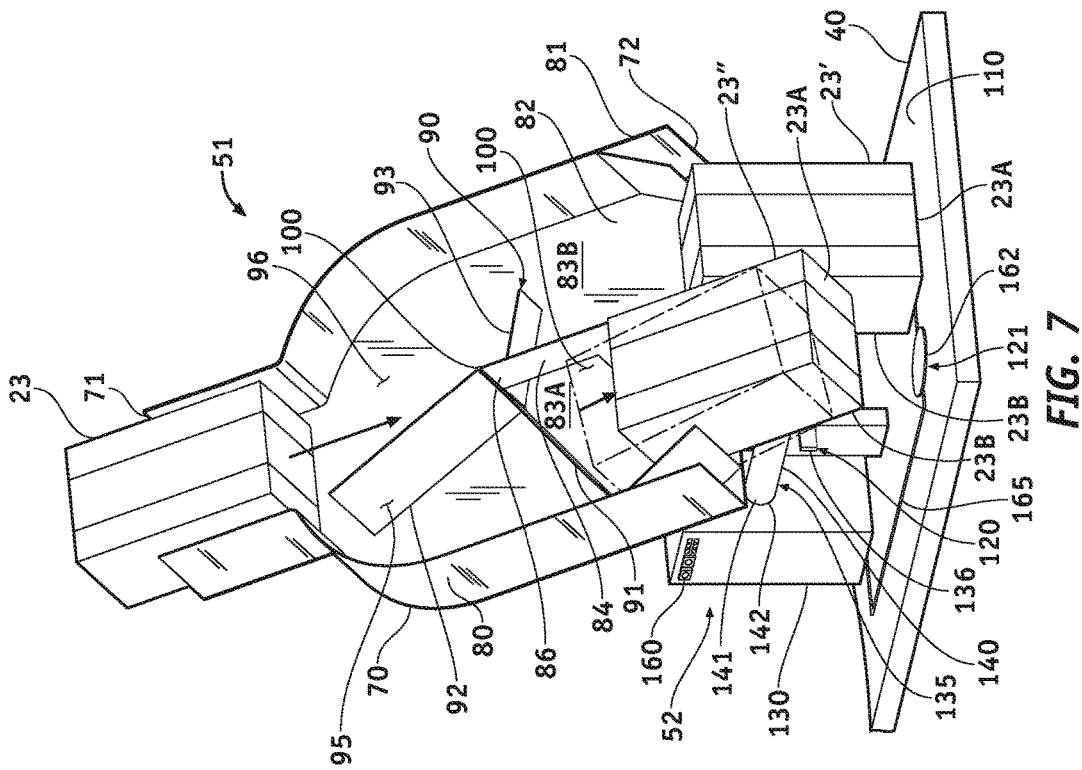
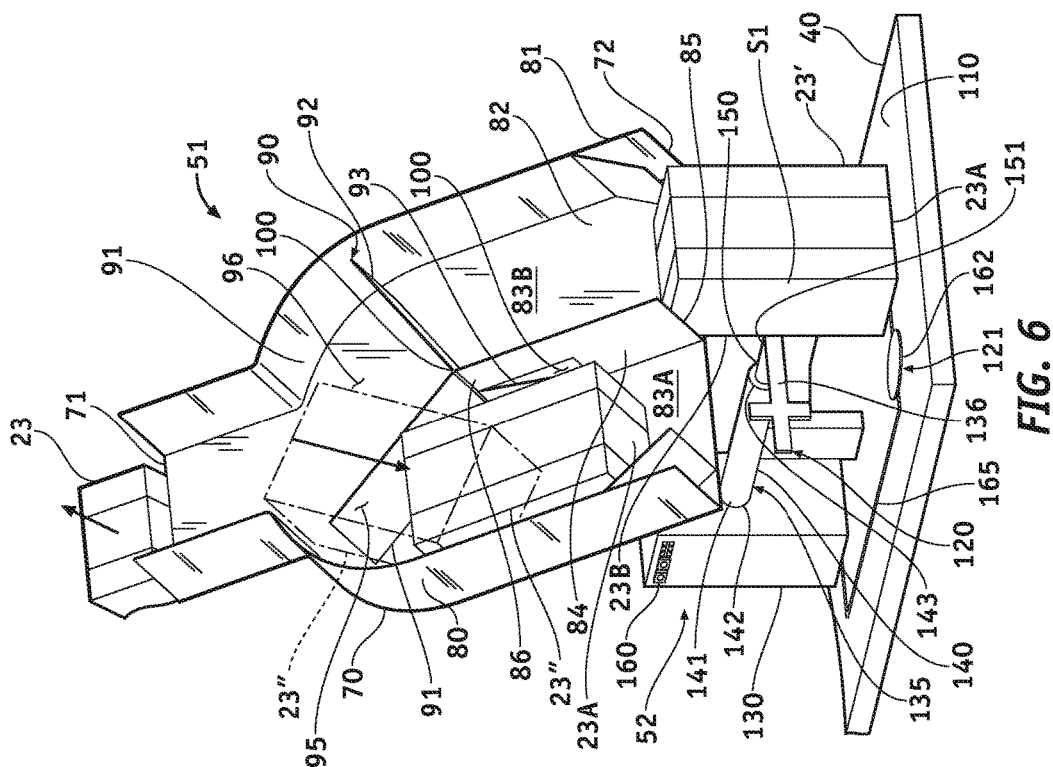
FIG. 6
FIG. 7

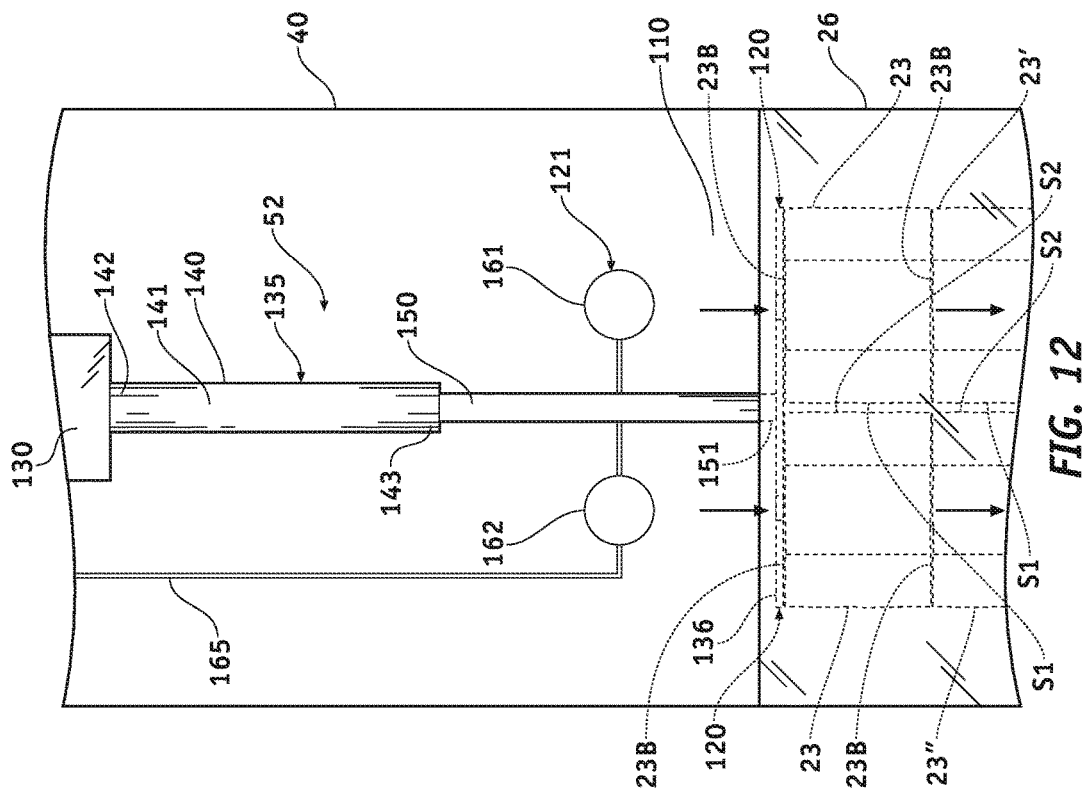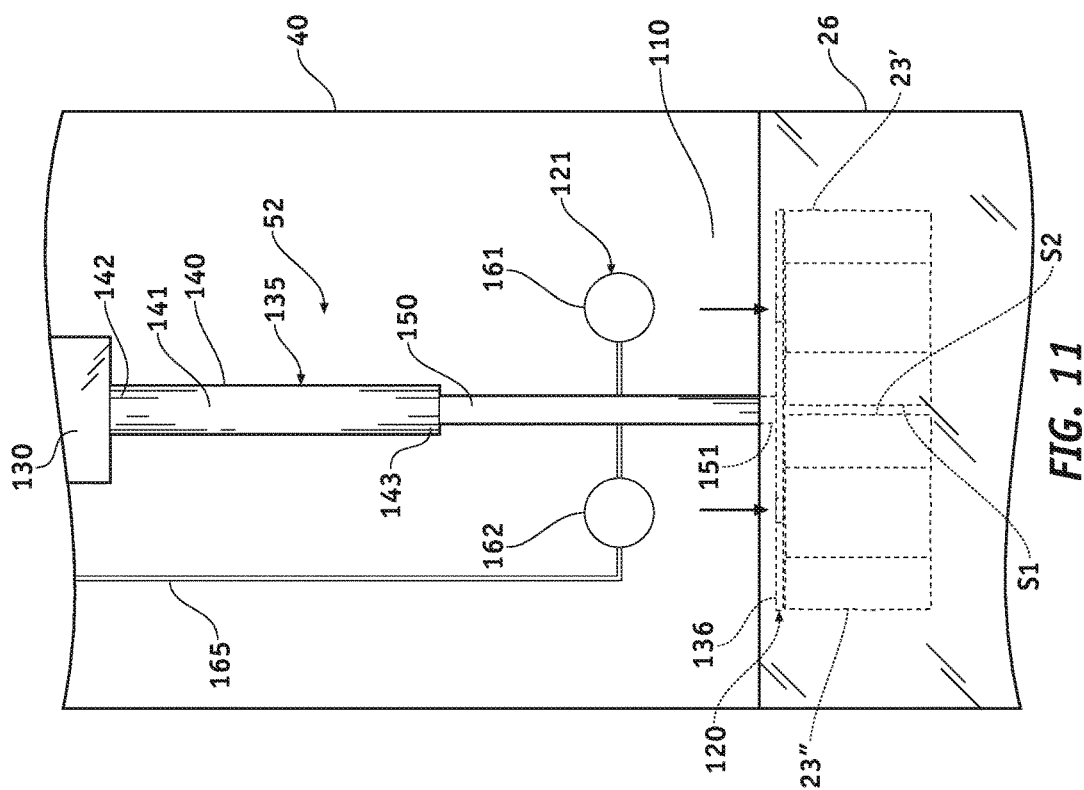

BALE ACCUMULATOR AND BALE ACCUMULATION METHODS

FIELD OF THE INVENTION

The present invention relates to farm machinery.

More particularly, the present invention relates to group balers for baling groups of bales of compressed crop material.

In a further and more specific aspect, the present invention relates to apparatus and methods for accumulating and packing bales into a group baler.

BACKGROUND OF THE INVENTION

A baler is a piece of farm equipment used to compress cut cropped material, such as hay, straw, cotton, etc., into compact bales for handling, transport, and storage. A variety of balers are commonly available for producing cylindrical or rectangular bales of various sizes bound with twine, strapping, netting, or wire.

Round balers are commonly used in industrialized countries. In the operation of a round baler, crop material is rolled up inside the baler into a roll of predetermined size, which is bound by twin or netting and then deposited from the rear of the baler onto the ground for further handling. Round bales require specific treatment for transport and handling because of their ability to roll. In the operation of a rectangular baler, crop material is gathered up inside the baler into a rectangle of predetermined size, which is bound by twine or netting and then deposited from the rear of the baler onto the ground for further handling.

Rectangular bales are easier to handle and transport compared to round bales because they inherently resist rolling and can be easily stacked for transport and storage, and group baled by a group baler. In the use of a group baler, which is often referred to as a bundler or a grouper, bales are packed into the group baler in a predetermined pattern. After a predetermined number of bales are packed into the group baler, the bales are bound together, such as by twine, netting, wire, plastic strapping, or steel strapping, into a group bale, which is then deposited onto the field. Although group balers are useful for creating groups of bound bales that are safe to transport and easy to store, loading a group baler is difficult and cumbersome, often requiring specialized equipment and manpower at substantial cost to the farmer.

SUMMARY OF THE INVENTION

According to the principle of the invention, a bale accumulator for grouping bales for group baling includes a platform, a depositor mounted adjacent to the platform for sequentially depositing bale sets onto the platform, each bale set when deposited onto the platform includes a pair of bales positioned upright and side-by-side in a packing orientation so that their corresponding long sides are axially juxtaposed, and a packer apparatus mounted adjacent to the platform for packing one bale set at a time from the platform into a group baler trailing the platform each time a bale set is deposited onto the platform from the depositor without changing the packing orientation of the bales of each bale set. The packer apparatus includes a ram for ramming a bale set along a linear drive path from the platform into the group baler each time the ram actuates, and a sensor apparatus operatively coupled to the ram and to the platform, wherein the ram actuates each time the sensor apparatus senses a bale set deposited onto the platform. The ram includes a drive assembly drivenly coupled to a frame. The frame is driven by the drive assembly from a starting position to a ramming position, for engaging and ramming a bale set from the platform into the group baler along the linear drive path, and back to the starting position from the ramming position, each time the drive assembly actuates. The drive assembly is a cylinder assembly including a cylinder and an operating rod. The frame is mounted on the operating rod, the operating rod is mounted partially within the cylinder for movement in reciprocal directions, and the frame moves in reciprocal directions between the starting and ramming positions upon actuation of the operating rod in reciprocal directions. The depositor is upright relative to the platform for sequentially gravity depositing bale sets onto the platform.

According to the principle of the invention, a bale accumulator for grouping bales for group baling includes a platform, a frame mounted adjacent to the platform, and a packer apparatus mounted adjacent to the platform. The frame includes a pair of bale-receiving areas for alternately depositing bales onto the platform into bale sets, each bale set when deposited onto the platform includes a pair of bales positioned upright and side-by-side in a packing orientation so that their corresponding long sides are juxtaposed, and a gate, the gate is movable between alternate positions for alternately directing bales into the bale-receiving areas, and the gate moves alternately from one to the other of the alternate positions each time a bale passes the gate. The packer apparatus is for packing one bale set at a time from the platform into a group baler trailing the platform each time a bale set is deposited onto the platform from the bale-receiving areas of the frame without changing the packing orientation of the bales of each bale set. The packer apparatus includes a ram for ramming a bale set along a linear drive path from the platform into the group baler each time the ram actuates, and a sensor apparatus operatively coupled to the ram and to the platform, wherein the ram actuates each time the sensor apparatus senses a bale set deposited onto the platform. The ram includes a drive assembly drivenly coupled to a frame. The frame is driven by the drive assembly from a starting position to a ramming position, for engaging and ramming a bale set from the platform into the group baler along the linear drive path, and back to the starting position from the ramming position, each time the drive assembly actuates. The drive assembly is a cylinder assembly including a cylinder and an operating rod. The frame is mounted on the operating rod, the operating rod is mounted partially within the cylinder for movement in reciprocal directions, and the frame moves in reciprocal directions between the starting and ramming positions upon actuation of the operating rod in reciprocal directions. The bale-receiving areas of the frame are upright relative to the platform for gravity depositing bale sets onto the platform.

According to the principle of the invention, a bale-accumulation method includes providing a platform, associated with a ram, and a group baler trailing the platform, sequentially depositing bale sets onto the platform between the ram and the group baler, each one of the bale sets when deposited onto the platform includes a pair of bales positioned upright and side-by-side in a packing orientation so that their corresponding long sides are juxtaposed, and actuating the ram packing one bale set at a time from the platform into the group baler each time a bale set is deposited onto the platform without changing the packing orientation of the bales of each bale set. The step of sequentially depositing bale sets onto the platform between the ram and the group baler further includes providing a frame including bale-receiving areas for alternately depositing bales onto the platform between the ram and the group baler when bales are applied alternately to the bale-receiving areas, and applying bales alternately to the bale-receiving areas. The step of applying bales alternately to the bale-receiving areas further includes gravity feeding bales alternately to the bale-receiving areas. The step of actuating the ram packing one bale set at a time from the platform into the group baler each time a bale set is deposited onto the platform without changing the packing orientation of the bales of each bale set further includes providing a sensor apparatus operatively coupled to the ram and to the platform via a control unit, and the control unit automatically actuating the ram each time the sensor apparatus senses a bale set deposited onto the platform.

BRIEF DESCRIPTION OF THE DRAWINGS

Referring to the drawings:

FIGS. 2-8 illustrate a sequence of steps of accumulating bales into a bale set via the accumulator of FIG. 1; and FIGS. 9-12 illustrate a sequence of steps of packing bale sets into a group baler via the accumulator of FIG. 1.

DETAILED DESCRIPTION

Figure 1:
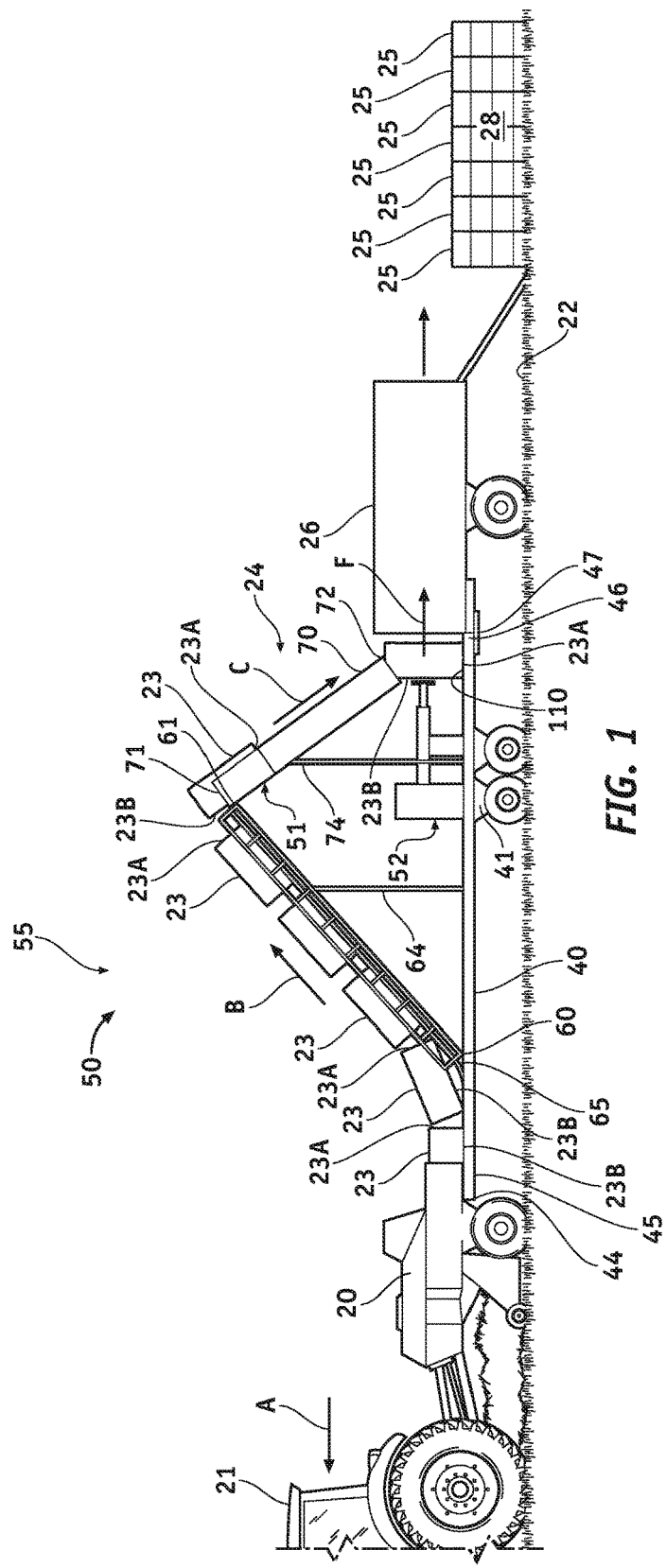
FIG. 1 is a side elevation view of a baler, towed behind a tractor, shown partially, for gathering and compressing cut cropped material from a field into compact bales, an accumulator, towed behind the baler, for receiving the bales from the baler, grouping the bales into bale sets ahead of a group baler towed behind the accumulator, and packing the bale sets, one bale set at a time as each one is formed, into the group baler for group baling a predetermined number of bale sets 25 into a compact group bale that is deposited from the rear of the group baler onto the field.

Turning now to the drawings, in which like reference characters indicate corresponding elements throughout the several views, attention is first directed to FIG. 1, in which there is seen a side elevation view of a baler 20, towed behind a tractor 21, shown partially, for gathering and compressing cut cropped material from field 22 into compact bales 23, an accumulator 24, towed behind baler 20, for receiving bales 23 from baler 20, grouping or otherwise accumulating bales 23 into bale sets 25, one bale set 25 at a time, ahead of a group baler 26 towed behind accumulator 24, and packing bale sets 25, one bale set 25 at a time as each one is formed, into group baler 26 for group baling a predetermined number of bale sets 25 into a compact group bale 28 that is deposited from the rear of group baler 26 onto field 22 for further handling. Baler 20, tractor 21, and group baler 26 are conventional and well known to the skilled farmer. Skilled farmers routinely refer to group baler 26 as bundlers or groupers.

Baler 20 is hitched to and trails tractor 21, accumulator 24 is hitched to and trails baler 20, and group baler 26 is hitched to and trails accumulator 24. Baler 20, accumulator 24, and group baler 26 are wheeled machines, which enables them to roll in series across the field when advanced by tractor 21. In use, the entire machine implement assembly of baler 20, accumulator 24, and group baler 26 is towed by tractor 21 forwardly in the direction of arrowed line A across field 22 for gathering and baling the cut cropped material from field into bales 23 via baler 20, grouping/accumulating bales 23 into bale sets 25 via accumulator 24 and packing group baler 26 with bale sets 25 one-by-one via accumulator 24 as each bale set 25 is formed, and, after filling group baler 26 with its inherent, selected, or predetermined capacity of bale sets 25, group baling baler bales sets 25 into group bale 28 via group baler 26 and depositing group bale 28 via group baler 26 from the rear of group baler 26 onto field 22 for further handling. Each bale set 25 includes a pair of upright bales 23 positioned side-by side, and group bale 28 includes seven bale sets packed together in a row, namely in-line from front to back. The bales 23 of each bale set 25 are not baled together individually. Rather, bale sets 25 are packed unbaled into group baler 26, which then group bales bale sets 25 together into group bale 28 and deposits group bale 28 onto field 22.

With continuing reference to FIG. 2, accumulator 24 includes elongate platform 40, conveyor 50, depositor 51, and packer apparatus 52. Platform 40, a heavy-duty decked frame, is mounted atop a wheeled chassis 41 for enabling wheeled movement of accumulator 24 across field 22. Conveyor 50, depositor 51, and packer apparatus 52 are carried or otherwise supported by platform 40.

Platform 40 includes leading end 44 hitched to the rear of baler 20 via hitch 45, and trailing end 46 hitched to the front of group baler 26 via hitch 47. Conveyor 50 and depositor 51 are mounted atop platform 40 between leading end 44 and trailing end 46. Conveyor 50 is between baler 20 and depositor 51, and depositor 51 is between conveyor 50 and group baler 26. Conveyor 50 is for picking up bales one-by-one from baler 20 and conveying them one-by-one to depositor 51 and applying them one-by-one into depositor 51, depositor 51 is for accepting bales 23 from conveyor 50 one-by-one and sequentially depositing bales 23 one-by-one onto platform 40 in bale sets 25 ahead of group baler 26, each bale set 25 when deposited onto platform 54 from depositor 51 being a pair of bales 23 positioned upright and side-by-side in a packing orientation without being baled together so that their corresponding long sides are axially juxtaposed, and packer apparatus 52 is for packing each bale set 25, one at a time as each bale set 25 is formed, from platform 40 into group baler 26 trailing platform 40 each time a bale set 25 is deposited onto platform 40 from depositor 50 without changing the packing orientation of the bales 23 of each bale set 25. Packing bale sets 25 into group baler 26 from accumulator 24 without changing the packing orientation of the bales 23 after depositing them onto platform 40 is cost-efficient and expeditious, eliminating the need for complex and costly auxiliary bale-reorienting equipment.

Conveyor 50 is for conveying bales 23, one-by-one, from baler 20 to depositor 51. Conveyor 50 is a well-known and conventional motor-driven belt conveyor having an inlet end 60 and an opposed outlet end 61. Inlet end 60 is mounted, such as with mechanical fasteners, welding, or the like, atop platform 40 adjacent to leading end 44 to the rear of baler 20, and inclines upwardly and forwardly in the direction of arrowed line B at an inclined angle of from 40-50 degrees toward depositor 51 from inlet end 60 to outlet end 61. An upright support 64 connected to platform 40 and to conveyor 50 between its inlet and outlet ends 60 and 61 supports conveyor 50 in its inclined orientation. Conveyor 50 rotates a belt 65 when conveyor 50 is actuated. Belt 65 is a part of conveyor 50. Bales 23 formed one-by-one by baler 20 exit the rear of baler 20 one-by-one, and are applied one-by-one onto rotating belt 65 at inlet end 60, and rotating belt 65, in turn, conveys bales 23, one behind the other, upwardly and forwardly in the direction of arrowed line B from inlet end 60 of conveyor 50 to elevated outlet end 61 of conveyor 50, where they are deposited, one after the other, into depositor 51 for accumulation into bale sets 25 on platform 40.

Depositor 51 gravity feeds bales 23 one-by-one from elevated outlet end 61 of conveyor 50 into bale sets 25 on platform 40.

Bales 23 are rectangular. Accordingly, baler 20 is a conventional type that produces rectangular bales of a preselected size. In this example, bales 23 formed one-by-one by baler 20 exit the rear of baler 20 one-by-one end first and resting on one of their long sides in what is a resting orientation, and are applied one-by-one in this resting orientation, namely, end 25A first resting on the one of its long sides 23B, onto rotating belt 65 at inlet end 60. Rotating belt 65 takes up and conveys bales 23, one behind the other, upwardly and forwardly in the direction of arrowed line B from inlet end 60 of conveyor 50 to elevated outlet end 61 of conveyor 50, where they are dropped end 23A first, one after the other, into depositor 51. Each bale 23 drops and slides through depositor in the resting orientation, which is end 23A first sliding downwardly on depositor 51 on the one of its long sides 23B. Depositor 51 accumulates bales 23 one-by-one and gravity deposits bale sets 25 onto platform 40. Bales 23 can be small rectangular bales, bales that are light enough for one person to handle, about 45 to 60 pounds, or comparatively larger bales depending on the type of baler employed.

Depositor 51 includes a frame 70 having an elevated inlet end 71 proximate to outlet end 61 of conveyor 50 and an opposed outlet end 72 lowered toward platform 40 ahead of the entrance to group baler 26. Inlet end 71 is mounted to outlet end 61 of conveyor 50, such as with mechanical fasteners, welding, or the like, and inclines downwardly in the direction of arrowed line C at an inclined angle of from 50-60 degrees toward group baler 26 from inlet end 71 to outlet end 72. An upright support 74 connected to platform 40 and to frame 70 between its inlet and outlet ends 71 and 72 supports frame 70 in its inclined orientation. Elevated inlet end 71 accepts bales 23 one-by-one from outlet end 61 of conveyor 50. Bales 23 drop one-by-one downwardly through depositor 51 via gravity from inlet end 71 to outlet end 72 and are deposited one-by-one onto platform 40 from outlet end 72 into bale sets 25, which are formed by depositor 51 sequentially. Depositor 51 accumulates bales 23 sequentially into bale sets 25 for depositing into group baler 26. In other words, depositor 51 gravity feeds/delivers bales 23 onto platform 40 sequentially into bale sets 25.

Referring to FIGS. 2-8, frame 70 is an open chute consisting of opposite sidewalls 80 and 81 joined to either side of a flat base or floor 82, which together define inlet and outlet ends 71 and 72 and which concurrently extend from inlet end 71 to outlet end 72. Frame 70 is narrow at inlet end 71, and widens downwardly therefrom to a widened area to outlet end 72 so as to define a pair of opposite, side-by-side bale-receiving areas 83A and 83B on either side of a central divider 84 of frame 70 at the widened area defined by frame 70. Divider 84 extends outwardly from floor 92 between sidewalls 80 and 81, and extends upwardly from a lower end 85 at outlet end 72 of frame 70 to an upper end 86 at the middle of the widened area defined by frame 70 between inlet end 71 and outlet end 72. A bale director or gate 90 is positioned centrally in the frame 70 widened area and is mounted rotationally via hinge 100 to upper end 86 of divider 94. Gate 90 includes a pair of diverting arms 91 and 92 and a trigger arm 93 that radiate outwardly from hinge 100. Arms 91, 92, and 93 are angularly offset. Hinge 100 enables gate 90 to rotate between an initial position in FIG. 2 and an alternate position in FIG. 5. Hinge 100 is a conventional and well-known stop hinge, which disables gate from rotating beyond its initial position in FIG. 2 for diverting bales into bale-receiving area 83B and at the same time obstructing bales from passing into bale-receiving area 83A from inlet end 71, and its alternate position in FIG. 5 for diverting bales into bale-receiving area 83A and at the same time obstructing bales from passing into bale-receiving area 83B from inlet end 71.

Diverting arm 91 is angled downwardly from hinge 100 into bale-receiving area 83A, diverting arm 92 is angled upwardly from hinge 100 toward sidewall 80 toward one side of inlet end 71 closing entrance 95 into bale-receiving area 83A from inlet end 71 while at the same time opening entrance 96 into bale-receiving area 83B from inlet end 71, and trigger arm 93 is angled downwardly from hinge 100 into bale-receiving area 83B in the path of bales through bale-receiving area 83B, when gate 90 is in its initial position in FIG. 2. In operation from this initial position of gate 90, a bale 23' is dropped end first into inlet end 71 of frame 70 from outlet end 61 of conveyor 50 of FIG. 1. Bale 23' falls slidingly by gravity end 23A first through inlet end 71 and strikes diverting arm 92 closing entrance 95 to bale-receiving area 83A, which diverts the bale 23' end 23A first into bale-receiving area 83B through entrance 96 thereto. The end 23A of bale 23' strikes trigger arm 93 in the path of bale 23' through bale-receiving area 83B when bale 23' falls slidingly by gravity through bale-receiving area 83B, which rotates gate 90 in the direction of arcuate arrowed line D in FIG. 2 in response from its initial position in FIG. 2 toward its alternate position in FIG. 5. As bale 23' drops slidingly downward through bale-receiving area 83B in FIGS. 3 and 4 and gate 90 rotates from its initial position in the direction of arrowed line D in response toward its alternate position in FIG. 5, trigger arm 93 rotates out of the way of the path of bale 23' through bale-receiving area 83B from bale-receiving area 83B into bale-receiving area 83A through an opening 102 between divider 84, hinge 100, and floor 82 so as to extend downwardly from hinge 100 into bale-receiving area 83A in the path of bales through bale-receiving area 83A enabling bale 23' to drop end 23A down through outlet end 72 from bale-receiving area 83B upright onto a landing area 110 of platform 40 in FIG. 5 under outlet end 72. At the same time, diverting arm 92 rotates downwardly into bale-receiving area 83B and diverting arm 91 rotates upwardly toward sidewall 81 to the opposite side of inlet end 71 obstructing the path of bales into bale-receiving area 83B through entrance 96 thereto from inlet end 71. Hinge 100 arrests gate 100 from rotating beyond its alternate position in FIG. 5.

Diverting arm 92 is angled downwardly from hinge 100 into bale-receiving area 83B, diverting arm 91 is angled upwardly from hinge 100 to the opposite side of inlet end 71 toward sidewall 81 closing entrance 96 into bale-receiving area 83B from inlet end 71 while at the same time opening entrance 95 into bale-receiving area 83A from inlet end 71, and trigger arm 93 is angled downwardly from hinge 100 into bale-receiving area 83A in the path of bales through bale-receiving area 83A, when gate 90 is in its alternate position in FIG. 5. In operation from this alternate position of gate 90, the next bale 23" is dropped end 23A first into inlet end 71 of frame 70 from outlet end 61 of conveyor 50 of FIG. 1. Bale 23" falls slidingly by gravity end 23A first through inlet end 71 and strikes diverting arm 91 closing entrance 96 to bale-receiving area 83B in FIG. 5 which diverts the bale 23" end 23A first into bale-receiving area 83A through entrance 95 thereto. The end 23A of bale 23" strikes trigger arm 93 in the path of bale 23" through bale-receiving area 83A when bale 23" falls slidingly by gravity through bale-receiving area 83A, which rotates gate 90 in the direction of arcuate arrowed line E in FIG. 5 in response from its alternate position in FIG. 5 toward its initial position in FIGS. 2 and 7. As bale 23" drops slidingly downward through bale-receiving area 83A in FIGS. 6 and 7 and gate 90 rotates from its initial position in the direction of arrowed line E in response toward its initial position in FIG. 7, trigger arm 93 rotates out of the way of the path of bale 23" through bale-receiving area 83A from bale-receiving area 83A into bale-receiving area 83B through opening 102 between divider 84, hinge 100, and floor 82 so as to extend downwardly from hinge 100 into bale-receiving area 83B in the path of bales through bale-receiving area 83B enabling bale 23" to drop end 23A down through outlet end 72 from bale-receiving area 83A upright onto landing area 110 of platform 40 in FIG. 8 under outlet end 72 alongside bale 23' so as to form a bale set 25. At the same time, diverting arm 91 rotates downwardly into bale-receiving area 83A and diverting arm 92 rotates upwardly toward sidewall 80 to the one side of inlet end 71 obstructing the path of bales into bale-receiving area 83A through entrance 95 thereto from inlet end 71. Hinge 100 arrests gate 100 from rotating beyond its initial position in FIGS. 7 and 8.

Figure 8:
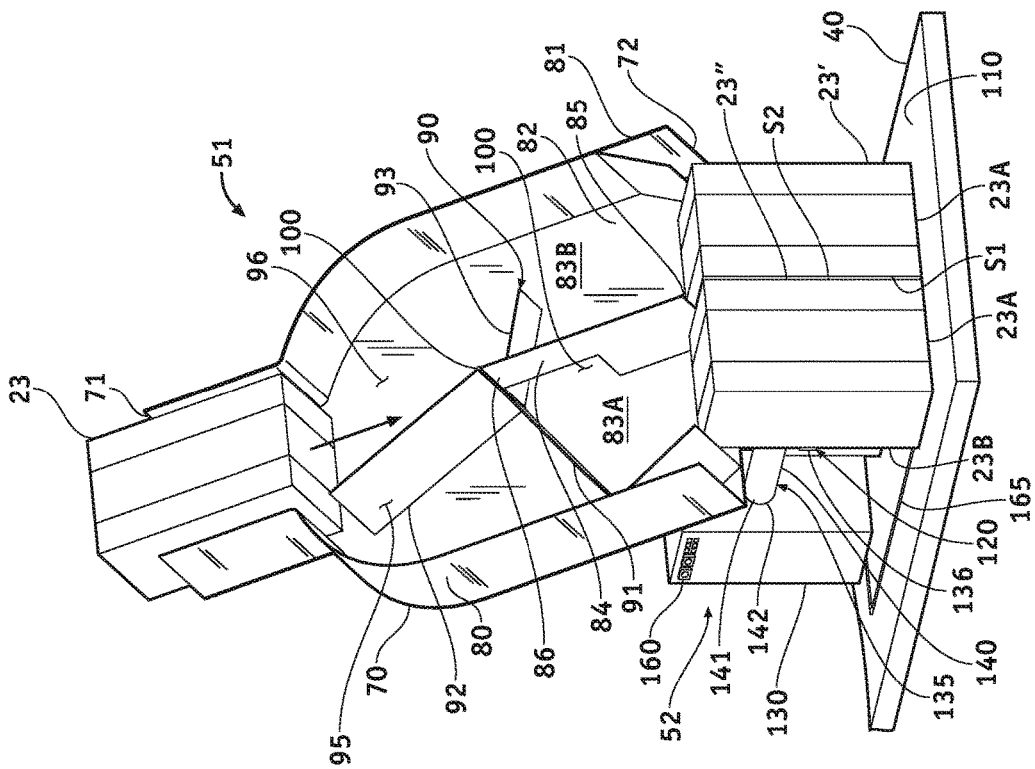

In FIG. 8, bale set 25 when deposited onto landing area 110 of platform 40 includes a pair of bales 23' and 23" positioned upright on their respective ends 23A on landing area 110 side-by-side in a packing orientation so that their corresponding or opposite long sides S1 and S2, respectively, are juxtaposed. Each bale set 25 is deposited onto landing area 110 of platform 40 from depositor 51 in this way, in which gate 90 is movable rotationally between alternate positions, an initial position in FIG. 2 and an alternate position in FIG. 5, for alternately directing bales 23 into the bale-receiving areas 83A and 83B, and wherein gate 90 moves alternately from one to the other of the alternate positions each time a bale 23 passes gate 90, for alternately dropping the bales 23, one beside the other, being in-line or otherwise axially-aligned from side-to-side and not from front-to-rear, onto landing area 110 of platform 40 ahead of the entrance to group baler 26.

In FIG. 2, packer apparatus 52 includes a ram 120 for ramming bale sets 25 (FIG. 1), one at a time as each is deposited on landing area 110 ahead of the entrance to group baler 26, along a horizontal linear drive path F from landing area 110 of platform 40 into group baler 26 through the entrance thereof trailing landing area 110 each time ram 120 actuates. Packer apparatus 52 further includes a sensor apparatus 121 operatively coupled to ram 120 and to landing area 110 of platform 40, wherein ram 120 actuates for ramming one bale set 25 from landing area 110 into group baler 26 each time sensor apparatus 121 senses a bale set 25 deposited onto landing area 110 of platform 40.

Figure 9:
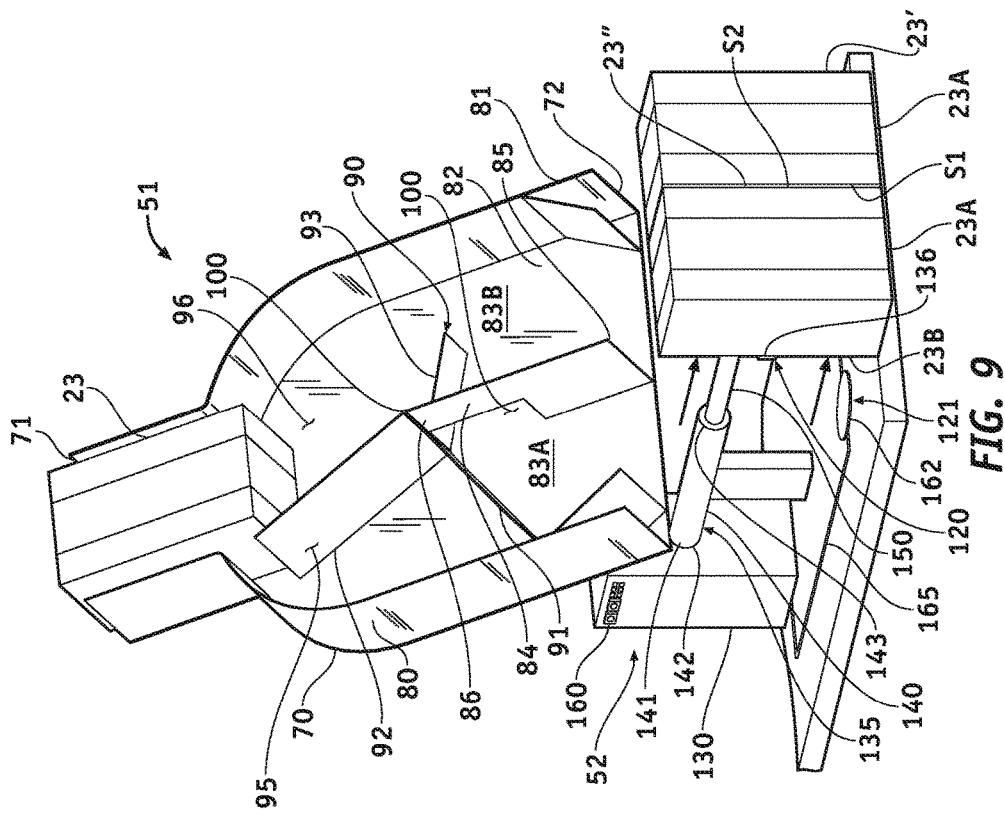
Figure 10:
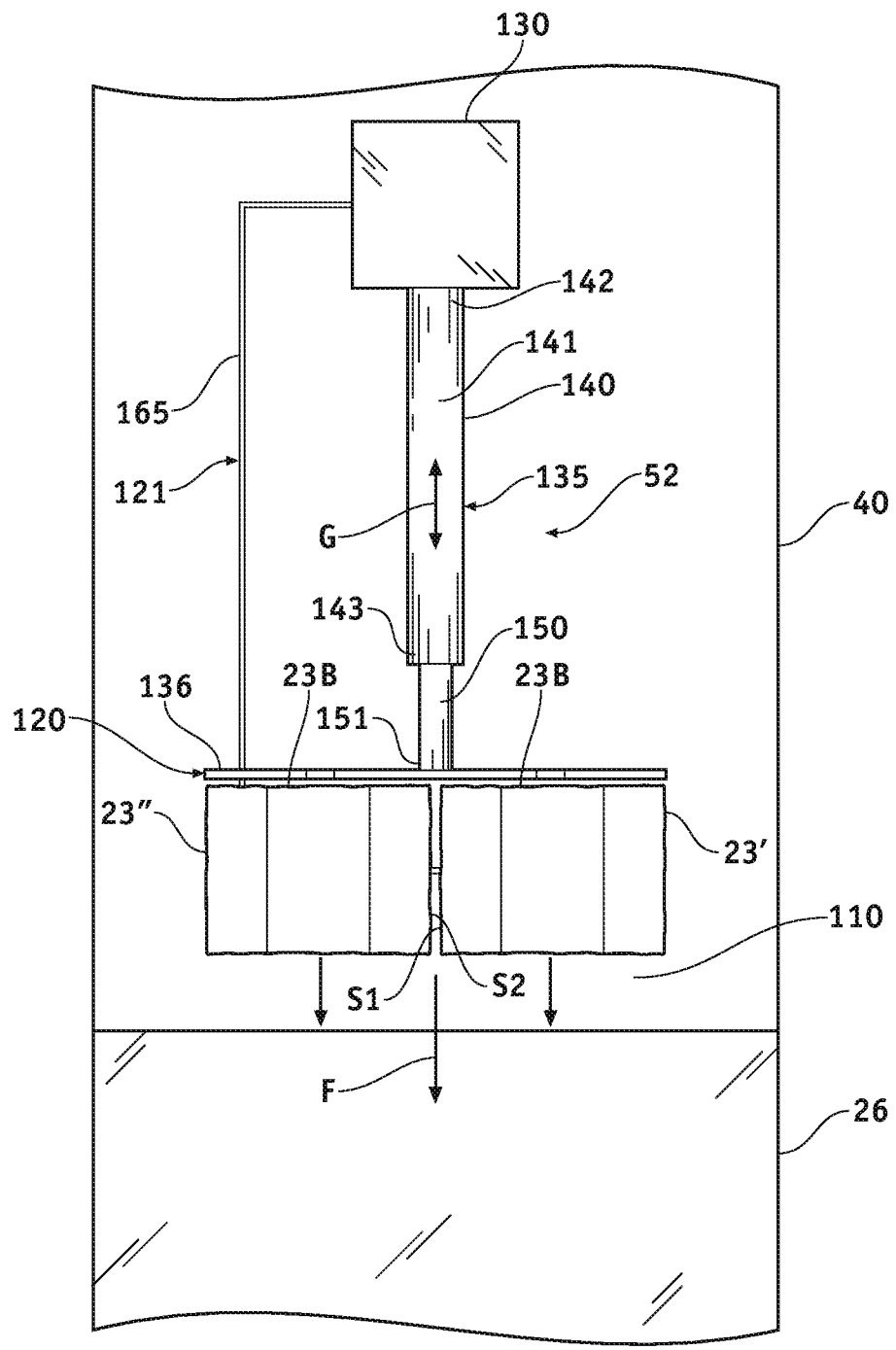

Ram 120 is mounted rigidly to a stanchion 130 mounted atop platform 40 to the rear of landing area 110. Ram 120 is mounted rigidly to stanchion 13 with mechanical fasteners, welding, or the like, and stanchion 130 is mounted atop platform 40 with mechanical fasteners, welding, or the like. Ram 120 is positioned at an elevated location relative to platform 40 to the rear of landing area 110 and includes a drive assembly 135 coupled drivenly to a frame 136 sized to concurrently engage the back sides of each pair of bales 23 of each bale set 25 deposited onto landing area 110. Drive assembly 135 extends forwardly from stanchion 130 to frame 136 located immediately to the rear of landing area 110. Frame 136 is driven by drive assembly 135 in reciprocal directions indicated by the double arrowed line G in FIGS. 2 and 10 along linear drive path F from a starting position in FIGS. 1-8 and 10 to a ramming position in FIGS. 9, 11, and 12, for engaging and ramming a bale set 25 from landing area 110 of platform 40 into group baler 26 along linear drive path F in FIGS. 11 and 12, and back to the starting position in FIGS. 1-8 and 10 from the ramming position in FIGS. 9, 11, and 12, each time ram 120 drive assembly 135 actuates.

In this example, drive assembly 135 is a cylinder assembly 140. Cylinder assembly 140 is a hydraulic cylinder assembly that includes a cylinder 141 and an operating rod 150. Cylinder 141 has an inner end 142 mounted rigidly to stanchion 130, and extends forward from inner end 142 to outer end 143. Frame 136 is mounted on outer end 151 of operating rod 150, such as with mechanical fasteners, welding, or the like, that is, in turn, mounted partially within cylinder 141 through outer end 142 for movement in reciprocal directions indicated by double arrowed line G along linear drive path F. Each time ram 120 actuates, operating rod 151 is actuated reciprocally by cylinder 141. Frame 136 moves reciprocally in the directions of double arrowed line G along linear drive path F in FIGS. 2 and 10 between the starting position in FIGS. 1-8 and 10 and the ramming position in FIGS. 9, 11, and 12 when operating rod 150 actuates, namely, upon actuation of operating rod 150 in reciprocal directions along double arrowed line G via cylinder 141. Frame 136 is in its starting position when operating rod 150 is in a retracted position in cylinder 141 in FIGS. 1-8 and 10. Frame 136 is in its ramming position when operating rod 150 is in an extended from cylinder 141 in FIGS. 9, 11, and 12.

In FIG. 2, sensor apparatus 121 includes a control unit 160 operatively coupled to sensors 161 and 162 for receiving and responding to output signals from sensors 161 and 162, and is operatively coupled to ram 120 for actuating ram 120 in response to output signals from sensors 161 and 162 sensing a bale set 25 deposited onto landing area 110 of platform 40. Control unit 53 is a processor, and is operatively coupled to sensors 161 and 162 and to ram 120 drive assembly 135 with conventional electrical wiring 165. Control unit 160 provides an operative coupling between drive assembly 135 and sensors 161 and 162.

Sensor 161 is under and is registered with outlet end 72 of bale-receiving area 83B, and sensor 162 is under and is registered with outlet end 72 of bale-receiving area 83A. Sensor 161 is for sensing the presence of a bale 23 deposited onto landing area 110 from bale-receiving area 83B. Sensor 162 is for sensing the presence of a bale 23 deposited onto landing area 110 from bale-receiving area 83A. Sensors 161 and 162 are pressure sensors each for sensing the pressure exerted by a deposited bale 23 on landing area 110. Sensor 161 is installed on landing area 110 beneath inlet end 72 of bale-receiving area 83B of depositor 51, and sensor 162 is installed on landing area 110 beneath inlet end 72 of bale-receiving area 83A. Electrical wiring 165 electrically connects sensors 161 and 162 to control unit 160 and control unit 160 to drive assembly 135, and is formed in platform 40 and stanchion 130. Electrical wiring 165 extends along platform from sensors 161 and 162 to stanchion 130, upwardly through stanchion 130 to control unit 160 and from control unit 160 through stanchion 130 to drive assembly 135, all of which are powered by conventional onboard power systems or from power systems of tractor 21 in FIG. 1.

The end 23A of a bale 23 is applied onto landing area 110 atop sensor 161 when the bale 23 is applied to landing area 120 from bale-receiving area 83B. Sensor 161 pressure senses a bale 23 when it is applied end 23A first onto landing area 110 atop sensor 161 from bale-receiving area 83B and issues a signal to control unit 160 in response. The end 23A of a bale 23 is applied onto landing area 120 atop sensor 162 when the bale 23 is applied to landing area 110 from bale-receiving area 83A. Sensor 162 pressure senses a bale 23 when it is applied end 23A first onto landing area 110 atop sensor 162 from bale-receiving area 83A and issues a signal to control unit 160 in response.

In the operation of accumulator 24 from the initial position of gate 90 in FIG. 2, bale 23' is dropped end first into inlet end 71 of frame 70 from outlet end 61 of conveyor 50 of FIG. 1. Bale 23' falls slidingly by gravity end 23A first on its side 23B on floor 82 through inlet end 71 and strikes diverting arm 92 closing entrance 95 to bale-receiving area 83A, which diverts the bale 23' end 23A first into bale-receiving area 83B through entrance 96 thereto. The end 23A of bale 23' strikes trigger arm 93 in the path of bale 23' through bale-receiving area 83B when bale 23' falls slidingly by gravity on its side 23B on floor 82 through bale-receiving area 83B, which rotates gate 90 in the direction of arcuate arrowed line D in FIG. 2 in response from its initial position in FIG. 2 toward its alternate position in FIG. 5. As bale 23' drops slidingly downward end 23A first on its side 23B on floor 82 through bale-receiving area 83B in FIGS. 3 and 4 and gate 90 rotates from its initial position in the direction of arrowed line D in response toward its alternate position in FIG. 5, trigger arm 93 rotates out of the way of the path of bale 23' through bale-receiving area 83B from bale-receiving area 83B into bale-receiving area 83A through opening 102 so as to extend downwardly from hinge 100 into bale-receiving area 83A in the path of bales through bale-receiving area 83A enabling bale 23' to drop end 23A down through outlet end 72 from bale-receiving area 83B upright onto landing area 110 of platform 40 in FIG. 5 atop sensor 161 immediately in front of one side of frame 136, and at the same time diverting arm 92 rotates downwardly into bale-receiving area 83B and diverting arm 91 rotates upwardly toward sidewall 81 to the opposite side of inlet end 71 obstructing the path of bales into bale-receiving area 83B through entrance 96 thereto from inlet end 71. Sensor 161 pressure senses bale 23' when it is applied end 23A first onto landing area 110 atop sensor 161 from bale-receiving area 83B and issues a signal to control unit 160 in response. Again, hinge 100 arrests gate 100 from rotating beyond its alternate position in FIG. 5.

Now with gate 90 in the alternate position in FIG. 5, the next bale 23" is dropped end 23A first into inlet end 71 of frame 70 from outlet end 61 of conveyor 50 of FIG. 1. Bale 23" falls slidingly by gravity end 23A first on its side 23B on floor 82 through inlet end 71 and strikes diverting arm 91 closing the entrance to bale-receiving area 83B in FIG. 5, which diverts the bale 23" end 23A first into bale-receiving area 83A through the entrance thereof. The end of bale 23" strikes trigger arm 93 in the path of bale 23" through bale-receiving area 83A when bale 23" falls slidingly by gravity through bale-receiving area 83A on its side 23B on floor 82, which rotates gate 90 in the direction of arcuate arrowed line E in FIG. 5 in response from its alternate position in FIG. 5 toward its initial position in FIGS. 2 and 7. As bale 23" drops slidingly downward through bale-receiving area 83A in FIGS. 6 and 7 end 23A first on its side 23B on floor 82 and gate 90 rotates from its initial position in the direction of arrowed line E in response toward its initial position in FIG. 7, trigger arm 93 rotates out of the way of the path of bale 23" through bale-receiving area 83A from bale-receiving area 83A into bale-receiving area 83B through opening 102 between divider 84, hinge 100, and floor 82 so as to extend downwardly from hinge 100 into bale-receiving area 83B in the path of bales through bale-receiving area 83B enabling bale 23" to drop end 23A down through outlet end 72 from bale-receiving area 83A upright onto landing area 110 of platform 40 in FIG. 8 atop sensor 162 immediately in front of the opposing side of frame 136 alongside bale 23' so as to form bale set 25, and at the same time diverting arm 91 rotates downwardly into bale-receiving area 83A and diverting arm 92 rotates upwardly toward sidewall 80 to the one side of inlet end 71 obstructing the path of bales into bale-receiving area 83A through entrance 95 thereto from inlet end 71. Again, hinge 100 arrests gate 100 from rotating beyond its initial position in FIGS. 7 and 8. Sensor 162 pressure senses bale 23" when it is applied end 23A first onto landing area 110 atop sensor 162 from bale-receiving area 83A and issues a signal to control unit 160 in response, which actuates ram 120 in response ramming bale set 25 in FIGS. 8 and 10 along linear drive path F from landing area 110 of platform 40 into group baler 26 in FIG. 11.

Drive assembly 135 actuates when ram 120 actuates. Frame 136 is driven by drive assembly 135 from its starting position in FIG. 10 against the back sides of bales 23' and 23" of bale set 25 to its ramming position in FIG. 11, for engaging and ramming bale set 25 from landing area 110 of platform 40 into group baler 26 along linear drive path F, and back to the starting position of frame 136 from its ramming position, when drive assembly 135 actuates. When frame 136 is moved from is starting position to its ramming position, it engages the back sides of the respective bales, namely, sides 253 of the respective bales 23' and 23", and slides them ends 23A down across platform 40 rearwardly into group baler 25 without changing the packing orientation of bales 23' and 23".

Control unit 160 resets when ram 120 actuates, and the described bale accumulation and packing process continues for the next bale set 25 and each subsequent next bale set 25, the next bale set 25 being shown is it would appear packed into group baler 26 directly against and in-line with, from the front to the rear, the previously-packed bale set 25. When each subsequent bale set 25 of bales 23 is packed into group packer 26 against the previous-packed bale set 25 as in FIG. 12, the bale sets 25 are incrementally advanced into group baler 26, and this packing process repeats until the predetermined number of bale sets 25 are packed into group baler 26, which is seven in this example.

In the present embodiment, bales 23 are applied to depositor 51 beginning with gate 90 in its initial position, in which the bales are applied onto landing area 120 in the order of from bale-receiving area 83B to bale-receiving area 83A in which signals are sent to control unit 160 correspondingly first from sensor 161 and then from sensor 162 in response. If desired, bales 23 can be applied to depositor 51 beginning with gate 90 in its alternate position, in which the bales are applied onto landing area 120 in the order of from bale-receiving area 83A to bale-receiving area 83B in which signals are sent to control unit 160 correspondingly first from sensor 162 and then from sensor 161 in response. Sensor apparatus 121 senses a bale set 25 deposited onto landing area 110 of platform 40 each time a corresponding pair of signals are sent to control unit 160, whether first from sensor 161 and then from sensor 162, or first from sensor 162 and then from sensor 161, sensor apparatus 121 senses a bale set 25 deposited onto landing area 110 of platform 40.

The bale sets 25 are in-line with one another and axially aligned, from the front to the rear, when they are packed into group baler 26. Group baler 26 group bales the bale sets 25 into group bale 28 and deposits group bale 28 outwardly from the rear of group baler 26 onto field 22 for further handling when group baler 26 is filled with its capacity of bale sets 25. The process continues for each subsequent group bale.

In sum, and referring in relevant part to FIGS. 1-12, an accumulator for grouping bales 23 for group baling is disclosed, which includes platform 40, depositor 51 mounted adjacent to platform 40 for sequentially depositing bale sets 25 onto platform 40, each bale set 25 when deposited onto platform 40 includes a pair of bales 23' and 23" positioned upright and side-by-side in a packing orientation so that their corresponding long sides S1 and S2 are axially juxtaposed, and packer apparatus 52 mounted adjacent to platform 40 for packing one bale set 25 at a time from platform 40 into group baler 26 trailing platform 40 each time a bale set 25 is deposited onto platform 40 from depositor 51 without changing the packing orientation of the bales 23' and 23" of each bale set 25. The packer apparatus 52 includes ram 120 for ramming a bale set 25 along linear drive path F from platform 40 into group baler 26 each time ram 120 actuates, and sensor apparatus 121 operatively coupled to ram 120 and to platform 40, wherein ram 120 actuates each time sensor apparatus 121 senses a bale set 25 deposited onto platform 40. Ram 120 includes drive assembly 135 drivenly coupled to frame 136. Frame 136 is driven by drive assembly 135 from the starting position to the ramming position, for engaging and ramming a bale set 25 from platform 40 into group baler 26 along linear drive path F, and back to the starting position from the ramming position, each time drive assembly 135 actuates. Drive assembly 135 is a cylinder assembly 140 including cylinder 141 and operating rod 150. Frame 136 is mounted on operating rod 150, operating rod 150 is mounted partially within cylinder 141 for movement in reciprocal directions, and frame 136 moves in reciprocal directions between the starting and ramming positions upon actuation of operating rod 150 in reciprocal directions. Depositor 51 is upright relative to platform 40 for sequentially gravity depositing bale sets 25 onto platform 40. Depositor 51 includes frame 70 mounted adjacent to platform 40. Frame 70 includes a pair of bale-receiving areas 83A and 83B for alternately depositing bales 23 onto platform 40 into bale sets 25, and gate 90. Gate 90 is movable between alternate positions for alternately directing bales 23 into bale-receiving areas 83A and 83B, and gate 90 moves alternately from one to the other of the alternate positions each time a bale 23 passes gate 90.

A bale-accumulation method according to the invention includes sequentially depositing bale sets 25 onto landing area 110 of platform 40 between ram 120 and group baler 26, actuating ram 120 packing one bale set 25 at a time from landing area 110 of platform 40 into group baler 26 each time a bale set 25 is deposited onto landing area 110 of platform 40 without changing the packing orientation of the bales 23 of each bale set 25. This bale set packing process is repeated for each bale set 25 until the predetermined number of bale sets 25 are packed into group baler 26, and group baler 26 group bales the bale sets 25 into group bale 28 and deposits group bale 28 outwardly from the rear of group baler 26 onto field 22 in FIG. 1 in response. The step of sequentially depositing bale sets 25 onto landing area 110 of platform 40 between ram 120 and group baler 26 further includes providing frame 70 including bale-receiving areas 83A and 83B for alternately depositing bales 23 onto landing area 110 of platform 40 between ram 120 and group baler 26 when bales 23 are applied alternately to bale-receiving areas 83A and 83B, and applying bales alternately to bale-receiving areas 83A and 83B, such as beginning with bale-receiving area 83B starting with gate 90 in its initial position, or beginning with bale-receiving area 83A starting with gate 90 in its alternate position. Applying bales 23 alternately to bale-receiving areas 83A and 83 preferably includes gravity feeding bales 23 alternately to bale-receiving areas 83A and 83B as disclosed herein, without having to use a machine conveyor. The step of actuating ram 120 packing one bale set 25 at a time from landing area 110 of platform 40 into group baler 2 each time a bale set 25 is deposited onto landing area 110 of platform 40 without changing the packing orientation of the bales 23 of each bale set 25 includes providing sensor apparatus 121 operatively coupled to ram 120 and to landing area 110 of platform 40 via control unit 160, and control unit 160 automatically actuating ram 120 each time sensor apparatus 121 senses a bale set 25 deposited onto landing area 110 of platform 40.

The invention has been described above with reference to illustrative embodiments. However, those skilled in the art will recognize that changes and modifications may be made to the embodiments without departing from the nature and scope of the invention. Various changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A bale accumulator for grouping rectangular bales for group baling, comprising:
   a depositor mounted adjacent to a platform for sequentially depositing bale sets onto the platform, each bale set when deposited onto the platform being a pair of rectangular bales positioned upright and side-by-side in a packing orientation with their corresponding long sides being axially juxtaposed;
   a packer apparatus mounted adjacent to the platform for packing one bale set at a time from the platform into a bundler trailing the platform each time a bale set is deposited onto the platform from the depositor;
   the depositor comprising:
   an inlet;
   an outlet adjacent to the platform;
   a first bale-receiving area and a second bale-receiving area on either side of a divider between the inlet and the outlet, a first entrance to the first bale-receiving area, and a second entrance to the second bale-receiving area;
   a gate mounted to the divider for movement between a first position and a second position, the gate including a first diverting arm, a second diverting arm, and a trigger arm;
   the first diverting arm extends into the first bale-receiving area, the second diverting arm closes the first entrance to the first bale-receiving area from the inlet leaving the second entrance to the second bale-receiving area open to the inlet for enabling a rectangular bale to drop into the second bale-receiving area through the second entrance from the inlet, and the trigger arm extends into the second bale-receiving area in a path of rectangular bales through the second bale-receiving area, when the gate is in its first position;
   the second diverting arm extends into the second bale-receiving area, the first diverting arm closes the second entrance to the second bale-receiving area from inlet leaving the first entrance to the first bale-receiving area open to the inlet for enabling a rectangular bale to drop into the first bale-receiving area through the first entrance from the inlet, and the trigger arm extends into the first bale-receiving area in a path of rectangular bales through the first bale-receiving area, when the gate is in its second position;

each time a rectangular bale passes through the second bale-receiving area when the gate is in the first position it strikes the trigger arm in the second bale-receiving area rotating the gate from the first position to the second position in response moving the trigger arm out of the path of rectangular bales through the second bale-receiving area for enabling the rectangular bale to drop onto the platform through the outlet from the second bale-receiving area; and each time a rectangular bale passes through the first bale-receiving area when the gate is in the second position it strikes the trigger arm in the first bale-receiving area rotating the gate from the second position to the first position in response moving the trigger arm out of the path of rectangular bales through the first bale-receiving area enabling the rectangular bale to drop onto the platform through the outlet from the first bale-receiving area.

2. The bale accumulator according to claim 1, wherein the packer apparatus comprises:
a ram for ramming a bale set from the platform to into the bundler each time the ram actuates; and
a sensor apparatus operatively coupled to the ram and to the platform, wherein the ram actuates each time the sensor apparatus senses a bale set deposited onto the platform.

3. The bale accumulator according to claim 2, wherein the sensor apparatus comprises a first sensor and a second sensor operatively coupled to the ram and to the platform via a control unit, wherein the control unit automatically actuates the ram each time the first sensor and the second sensor sense respective rectangular bales deposited onto the platform as a bale set.

4. The bale accumulator of claim 2, wherein the ram comprises:
a drive assembly drivenly coupled to a packer frame;
the packer frame is driven by the drive assembly from a starting position to a ramming position, for engaging and ramming a bale set from deposited onto the platform to into the bundler, and back to the starting position from the ramming position, each time the drive assembly actuates.

5. The bale accumulator according to claim 4, wherein the drive assembly comprises a cylinder assembly including a cylinder and an operating rod, the packer frame is mounted on the operating rod, the operating rod is mounted partially within the cylinder for movement in reciprocal directions, and the packer frame moves in reciprocal directions between the starting and ramming positions upon actuation of the operating rod in reciprocal directions.

6. A bale accumulator for grouping rectangular bales for group baling, comprising:
a depositor mounted adjacent to a platform for sequentially depositing bale sets onto the platform, each bale set when deposited onto the platform being a pair of rectangular bales positioned upright and side-by-side in a packing orientation so their corresponding long sides are axially juxtaposed;
a packer apparatus mounted adjacent to the platform for packing one bale set at a time from the platform into a bundler trailing the platform each time a bale set is deposited onto the platform from the depositor;
the depositor comprising:
an inlet;
an outlet adjacent to the platform;
a first bale-receiving area and a second bale-receiving area on either side of a divider between the inlet and the outlet, a first entrance to the first bale-receiving area, and a second entrance to the second bale-receiving area;
a gate mounted to the divider for movement between a first position and a second position, the gate including a first diverting arm, a second diverting arm, and a trigger arm;
the first diverting arm extends downwardly from the divider into the first bale-receiving area between the first entrance and the outlet, the second diverting arm extends upwardly from the divider closing the first entrance to the first bale-receiving area from the inlet leaving the second entrance to the second bale-receiving area open to the inlet for enabling a rectangular bale to drop into the second bale-receiving area through the second entrance from the inlet, and the trigger arm extends downwardly from the divider into the second bale-receiving area between the second entrance and the outlet in a path of rectangular bales through the second bale-receiving area, when the gate is in its first position;
the second diverting arm extends downwardly from the divider into the second bale-receiving area between the second entrance and the outlet, the first diverting arm extends upwardly from the divider closing the second entrance to the second bale-receiving area from inlet leaving the first entrance to the first bale-receiving area open to the inlet for enabling a rectangular bale to drop into the first bale-receiving area through the first entrance from the inlet, and the trigger arm extends downwardly from the divider into the first bale-receiving area between the first entrance and the outlet in a path of rectangular bales through the first bale-receiving area, when the gate is in its second position;
each time a rectangular bale passes through the second bale-receiving area when the gate is in the first position it strikes the trigger arm in the second bale-receiving area rotating the gate from the first position to the second position in response moving the trigger arm out of the path of rectangular bales through the second bale-receiving area enabling the rectangular bale to drop onto the platform through the outlet from the second bale-receiving area; and
each time a rectangular bale passes through the first bale-receiving area when the gate is in the second position it strikes the trigger arm in the first bale-receiving area rotating the gate from the second position to the first position in response moving the trigger arm out of the path of rectangular bales through the first bale-receiving area enabling the rectangular bale to drop onto the platform through the outlet from the first bale-receiving area.

7. The bale accumulator according to claim 6, wherein the packer apparatus comprises:
a ram for ramming a bale set from the platform to into the bundler each time the ram actuates; and
a sensor apparatus operatively coupled to the ram and to the platform, wherein the ram actuates each time the sensor apparatus senses a bale set deposited onto the platform.

8. The bale accumulator according to claim 7, wherein the sensor apparatus comprises a first sensor and a second sensor operatively coupled to the ram and to the platform via a control unit, wherein the control unit automatically actuates the ram each time the first sensor and the second sensor sense respective rectangular bales deposited onto the platform as a bale set.

9. The bale accumulator of claim 7, wherein the ram comprises:
   a drive assembly drivenly coupled to a packer frame;
   the packer frame is driven by the drive assembly from a starting position to a ramming position, for engaging and ramming a bale set from deposited onto the platform to into the bundler, and back to the starting position from the ramming position, each time the drive assembly actuates.

10. The bale accumulator according to claim 9, wherein the drive assembly comprises a cylinder assembly including a cylinder and an operating rod, the packer frame is mounted on the operating rod, the operating rod is mounted partially within the cylinder for movement in reciprocal directions, and the packer frame moves in reciprocal directions between the starting and ramming positions upon actuation of the operating rod in reciprocal directions.

* * * * *